US012183932B2

(12) United States Patent
Liu et al.

(10) Patent No.: US 12,183,932 B2
(45) Date of Patent: Dec. 31, 2024

(54) ELECTROCHEMICAL FLOW DEVICES AND METHODS OF MAKING THE SAME

(71) Applicant: Georgia Tech Research Corporation, Atlanta, GA (US)

(72) Inventors: Nian Liu, Atlanta, GA (US); Yutong Wu, Atlanta, GA (US); Fengyi Zhang, Atlanta, GA (US); Ryan P. Lively, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 17/768,743

(22) PCT Filed: Oct. 14, 2020

(86) PCT No.: PCT/US2020/055472
§ 371 (c)(1),
(2) Date: Apr. 13, 2022

(87) PCT Pub. No.: WO2021/076548
PCT Pub. Date: Apr. 22, 2021

(65) Prior Publication Data
US 2024/0145730 A1  May 2, 2024

Related U.S. Application Data

(60) Provisional application No. 62/914,605, filed on Oct. 14, 2019.

(51) Int. Cl.
*H01M 4/86* (2006.01)
*H01M 8/04082* (2016.01)
(Continued)

(52) U.S. Cl.
CPC ..... *H01M 4/8626* (2013.01); *H01M 8/04186* (2013.01); *H01M 8/04201* (2013.01); *H01M 8/188* (2013.01)

(58) Field of Classification Search
CPC .......... H01M 4/8626; H01M 8/04186; H01M 8/04201; H01M 8/188
See application file for complete search history.

(56) References Cited

U.S. PATENT DOCUMENTS 6,403,248 B1    6/2002  Eshraghi
2004/0142101 A1*  7/2004  Eshraghi ............. H01M 8/2404
                                                 427/115
(Continued)

FOREIGN PATENT DOCUMENTS

DE    102016122283 A1    5/2018
DE    102016122284 A1    5/2018

OTHER PUBLICATIONS

International Search Report and Written Opinion from Application No. PCT/US2020/055472 dated Feb. 10, 2021.

*Primary Examiner* — Stewart A Fraser
(74) *Attorney, Agent, or Firm* — Troutman Pepper Hamilton Sanders LLP; Ryan A. Schneider; Korbin M. Blunck

(57) ABSTRACT

An exemplary embodiment of the present disclosure provides an electrochemical device comprising a tube having an outer surface defining an interior volume of the tube; a first hollow fiber positioned in the interior volume of the tube, the first hollow fiber comprising: a first membrane defining an interior volume of the first hollow fiber; one or more first electrodes positioned in the interior volume of the first hollow fiber; and at least a first portion of a first electrolyte fluid positioned in the interior volume of the first hollow fiber; one or more second electrodes positioned in the interior volume of the tube and outside of the interior volume of the first hollow fiber; and a second electrolyte fluid positioned in the interior volume of the tube and
(Continued)

outside of the interior volume of the first hollow fiber. Also disclosed herein are methods of making an electrochemical device.

18 Claims, 13 Drawing Sheets

(51) Int. Cl.
*H01M 8/04186* (2016.01)
*H01M 8/18* (2006.01)

(56) References Cited

U.S. PATENT DOCUMENTS

| | | | |
|---|---|---|---|
| 2005/0181269 A1* | 8/2005 | Eshraghi | H01M 8/0278 |
| | | | 429/513 |
| 2005/0244682 A1 | 11/2005 | Meacham | |
| 2005/0271920 A1* | 12/2005 | Eshraghi | H01M 8/106 |
| | | | 429/535 |
| 2010/0216006 A1* | 8/2010 | Rennebeck | H01M 8/04186 |
| | | | 429/105 |
| 2016/0043423 A1 | 2/2016 | Huskinson et al. | |
| 2016/0099480 A1 | 4/2016 | Nie et al. | |

* cited by examiner

ELECTROCHEMICAL FLOW DEVICES AND METHODS OF MAKING THE SAME

CROSS-REFERENCE TO RELATED APPLICATIONS

This application claims the benefit, under 35 U.S.C. § 119(e), of U.S. Provisional Application Ser. No. 62/914,605, filed on 14 Oct. 2019, which is incorporated herein by reference in its entirety as if fully set forth below.

FIELD OF THE DISCLOSURE

The various embodiments of the present disclosure relate generally to electrochemical devices and methods of making the same, and more particularly to electrochemical flow devices.

BACKGROUND

Electrochemical flow devices have been widely applied for renewable energy storage and environmental purposes. Flow batteries provide a promising intermediate energy storage that converts sustainable resources to electricity and serves demands from grid level to hand-sized device because energy and power can be scaled separately. While significant progresses have been made to improve electric flow device energy density, the current electric flow device geometry limits the available power density. For a classic flat-sheet membrane-based electric flow device, extra parts such as flow distributors are necessary to avoid void space in the electrodes which significantly increases system volume and capital cost and lowers the power density. Also, the low surface-area-to-volume ratio of the membrane cannot match the electron transfer rate from the electrode, further limits the power density.

What is needed, therefore, is a change in electrochemical flow device geometry to unleash greater power density. Embodiments of the present disclosure address this need as well as other needs that will become apparent upon reading the description below in conjunction with the drawings.

BRIEF SUMMARY

The present disclosure relates to electrochemical devices and methods for making the same. An exemplary embodiment of the present disclosure provides a tube comprising an outer surface, a first hollow fiber, one or more first electrodes, one or more second electrodes, a first electrolyte fluid, and a second electrolyte fluid. The outer surface of the tube can define an interior volume of the tube. The first hollow fiber can be positioned in the interior volume of the tube. The first hollow fiber can comprise a membrane. The membrane can define an interior volume of the first hollow fiber. The one or more first electrodes can be positioned in the interior volume of the first hollow fiber. The one or more second electrodes can be positioned in the interior volume of the tube and outside of the interior volume of the first hollow fiber. The first electrolyte fluid can be positioned in the interior volume of the first hollow fiber. The second electrolyte fluid can be positioned in the interior volume of the tube and outside of the interior volume of the first hollow fiber.

In any of the embodiments disclosed herein, the electrochemical device can further comprise a first inlet and a first outlet. The first inlet can be in fluid communication with the interior volume of the first hollow fiber. The first inlet can be configured to flow the first electrolyte fluid into the interior volume of the first hollow fiber. The first outlet can be in fluid communication with the interior volume of the first hollow fiber. The first outlet can be configured to flow the first electrolyte fluid out of the interior volume of the first hollow fiber.

In any of the embodiments disclosed herein, the electrochemical device can further comprise a first electrolyte fluid reservoir. The first inlet can be configured to flow the first electrolyte fluid from the first electrolyte fluid reservoir into the interior volume of the first hollow fiber. The first outlet can be configured to flow the first electrolyte fluid from the interior volume of the first hollow fiber into the first electrolyte fluid reservoir.

In any of the embodiments disclosed herein, the electrochemical device can further comprise a second inlet and a second outlet. The second inlet can be in fluid communication with the interior volume of the tube. The second inlet can be configured to flow the second electrolyte fluid into the interior volume of the tube. The second outlet can be in fluid communication with the interior volume of the tube. The second outlet can be configured to flow the second electrolyte fluid out of the interior volume of the tube.

In any of the embodiments disclosed herein, the electrochemical device can further comprise a second electrolyte fluid reservoir. The second inlet can be configured to flow the second electrolyte fluid from the second electrolyte fluid reservoir into the interior volume of the tube. The second outlet can be configured to flow the second electrolyte fluid from the interior volume of the tube into the second electrolyte fluid reservoir.

In any of the embodiments disclosed herein, the electrochemical device can comprise at least a portion of the tube and at least a portion of the first hollow fiber that are coaxial.

In any of the embodiments disclosed herein, the first membrane of the first hollow fiber can comprise an ion-exchange membrane.

In any of the embodiments disclosed herein, the first membrane of the first hollow fiber can comprise a cation-exchange membrane.

In any of the embodiments disclosed herein, the first membrane of the first hollow fiber can comprise an anion-exchange membrane.

In any of the embodiments disclosed herein, the electrochemical device can further comprise a second hollow fiber. The second hollow fiber can be positioned in the interior volume of the tube. The second hollow fiber can comprise a membrane, one or more third electrodes, and a first electrolyte fluid. The membrane can define an interior volume of the second hollow fiber. The one or more third electrodes can be positioned in the interior volume of the second hollow fiber. The first electrolyte fluid can be positioned in the interior volume of the second hollow fiber. The one or more second electrodes can be positioned in the interior volume of the tube and out-side of the interior volume of the first and the second hollow fibers. The second electrolyte fluid can be positioned in the interior volume of the tube and outside of the interior volume of the first and second hollow fibers.

In any of the embodiments disclosed herein, the one or more first electrodes can be longitudinally oriented in the interior volume of the first hollow fiber.

In any of the embodiments disclosed herein, the one or more second electrodes can be longitudinally oriented in the interior volume of the tube.

In any of the embodiments disclosed herein, the one or more second electrodes can be longitudinally oriented in the interior volume of the tube.

In any of the embodiments disclosed herein, the one or more first electrodes can comprise a metal.

In any of the embodiments disclosed herein, the one or more second electrodes can comprise a metal.

In any of the embodiments disclosed herein, the metal can be selected from the group consisting of lithium, sodium, magnesium, aluminum, potassium, calcium, titanium, vanadium, chromium, iron, cobalt, nickel, copper, zinc, rubidium, zirconium, ruthenium, rhodium, lead, silver, cadmium, indium, tin, cesium, tungsten, rhenium, osmium, iridium, platinum, gold, lead, and combinations thereof.

In any of the embodiments disclosed herein, the one or more first electrodes can comprise a non-metal.

In any of the embodiments disclosed herein, the one or more second electrodes can comprise a non-metal.

In any of the embodiments disclosed herein, the non-metal can be selected from the group consisting of carbon, carbon nanotubes, carbon felt, carbon paper, carbon cloth, graphene, graphite, polydimethylsiloxane, polyimide, and combinations thereof.

In any of the embodiments disclosed herein, the one or more first electrodes can comprise an organic material.

In any of the embodiments disclosed herein, the one or more second electrodes can comprise an organic material.

In any of the embodiments disclosed herein, the organic material can be selected from the group consisting of quinone, diimide, quinoxaline, phenolic ether, thioether, viologen, and combinations thereof.

In any of the embodiments disclosed herein, the one or more first electrodes can be a cathode.

In any of the embodiments disclosed herein, the one or more first electrodes can be an anode.

In any of the embodiments disclosed herein, the one or more second electrodes can be a cathode.

In any of the embodiments disclosed herein, the one or more second electrodes can be an anode.

In any of the embodiments disclosed herein, the first electrolyte fluid can be aqueous.

In any of the embodiments disclosed herein, the second electrolyte fluid can be aqueous.

In any of the embodiments disclosed herein, the first electrolyte fluid can be cathodic.

In any of the embodiments disclosed herein, the first electrolyte fluid can be anodic.

In any of the embodiments disclosed herein, the second electrolyte fluid can be cathodic.

In any of the embodiments disclosed herein, the second electrolyte fluid can be anodic.

In any of the embodiments disclosed herein, the electrochemical device can be a battery.

In any of the embodiments disclosed herein, the electrochemical device can further comprise a first pump. The first pump can be configured to flow the first electrolyte fluid through the interior volume of the first hollow fiber.

In any of the embodiments disclosed herein, the electrochemical device can further comprise a second pump. The second pump can be configured to flow the second electrolyte fluid through the interior volume of the tube.

In any of the embodiments disclosed herein, the first membrane of the first hollow fiber can comprise an ionomer.

In any of the embodiments disclosed herein, the first membrane of the first hollow fiber can comprise a polymer selected from the group consisting of polyethylene, polypropylene, polyfluoroethylene, perfluorosulfonate, polytetrafluoroethylene, sulfonated poly(arylene thioether ketone ketone), sulfonated poly(ether ether ketone), and combinations thereof.

In any of the embodiments disclosed herein, the first membrane of the first hollow fiber can comprise a copolymer selected from the group consisting of sulfonated tetrafluoroethylene monomer, perfluorinated monomer, per-fluorosulfonic acid monomer, per-fluorovinyl ether monomer, and combinations thereof.

In any of the embodiments disclosed herein, the first electrolyte fluid can comprise metal ions, and wherein the second electrolyte fluid can comprise metal ions.

In any of the embodiments disclosed herein, the first electrolyte fluid can comprise metal ions, and wherein the second electrolyte fluid can comprise halide ions.

In any of the embodiments disclosed herein, the first electrolyte fluid can comprise halide ions, and wherein the second electrolyte fluid can comprise metal ions.

In any of the embodiments disclosed herein, the metal ions can be selected from the group consist of lithium, sodium, magnesium, aluminum, potassium, calcium, titanium, vanadium, chromium, iron, cobalt, nickel, copper, zinc, rubidium, zirconium, ruthenium, rhodium, lead, silver, cadmium, indium, tin, cesium, tungsten, rhenium, osmium, iridium, platinum, gold, lead, and combinations thereof.

In any of the embodiments disclosed herein, the halide ions can be selected from the group consist of iodide, bromide, chloride, fluoride, and combinations thereof.

In any of the embodiments disclosed herein, the first electrolyte fluid can comprise an organic electrolyte, and wherein the second electrolyte fluid can comprise an organic electrolyte.

In any of the embodiments disclosed herein, the organic electrolyte can be selected from the group consist of quinone bromine, methyl viologen, anthraquinone, 2,2,6,6,-tetramethylpiperidine-1-oxyl, and 4-methoxy-2,2,6,6-tetra-methylpiperidine-1-oxyl, 2,5-di-tert-butyl-1,4-bis(2-methoxyethoxy)benzene, quinoxaline, camphorquinone, and combinations thereof.

Some embodiments of the present disclosure provide a method of operating an electrochemical device. The method can comprise providing an electrochemical device having a tube with an outer surface, a first hollow fiber, one or more first electrodes, one or more second electrodes, a first electrolyte fluid, and a second electrolyte fluid. The first hollow fiber can comprise a membrane. The membrane can define an interior volume of the first hollow fiber. The one or more first electrodes can be positioned in the interior volume of the first hollow fiber. The one or more second electrodes can be positioned in the interior volume of the tube and outside of the interior volume of the first hollow fiber. The first electrolyte fluid can be positioned in the interior volume of the first hollow fiber. The second electrolyte fluid can be positioned in the interior volume of the tube and outside of the interior volume of the first hollow fiber. The method can comprise transferring at least a portion of a first electrolyte fluid into the interior volume of the hollow fiber. The method can also comprise transferring at least a portion of a second electrolyte fluid into the interior volume of the tube. The method further can comprise generating a potential difference across the one or more first electrodes and the one or more second electrodes. The potential difference can be generated via an ion exchange between the first and second electrolyte fluids across the first membrane. The outer surface of the tube can define an interior volume of the tube. The first hollow fiber can be positioned in the interior volume of the tube. The first hollow fiber can comprise a membrane. The membrane can define an interior volume of the first hollow fiber. The one or more first electrodes can be positioned in the interior volume of the first hollow fiber. The one or more second electrodes can be positioned in the interior volume of the tube and outside of the interior volume of the first hollow fiber. The first electrolyte fluid can be positioned in the interior volume of the first hollow fiber. The second electrolyte fluid can be positioned in the interior volume of the tube and outside of the interior volume of the first hollow fiber.

In any of the embodiments disclosed herein, the first membrane can be an ion exchange membrane.

In any of the embodiments disclosed herein, the method can further comprise transferring at least a portion of a first electrolyte fluid into the interior volume of the first hollow fiber. The transferring can comprise flowing at least a portion of the first electrolyte fluid from a first electrolyte fluid reservoir into the interior volume of the first hollow fiber.

In any of the embodiments disclosed herein, the method can further comprise transferring at least a portion of a second electrolyte fluid into the interior volume of the tube. The transferring can comprise flowing at least a portion of the second electrolyte fluid from a second electrolyte fluid reservoir into the interior volume of the tube.

In any of the embodiments disclosed herein, the method can further comprise transferring the first electrolyte fluid and/or transferring the second electrolyte fluid. The transferring can comprise continuously flowing the first electrolyte fluid and/or the second electrolyte fluid, respectively.

In any of the embodiments disclosed herein, the method can further comprise transferring the first electrolyte fluid and/or transferring the second electrolyte fluid. The transferring can comprise periodically flowing the first electrolyte fluid and/or the second electrolyte fluid, respectively.

In any of the embodiments disclosed herein, the method can further comprise placing the electrochemical device in electrical parallel connection with a second electrochemical device.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Figure 1:
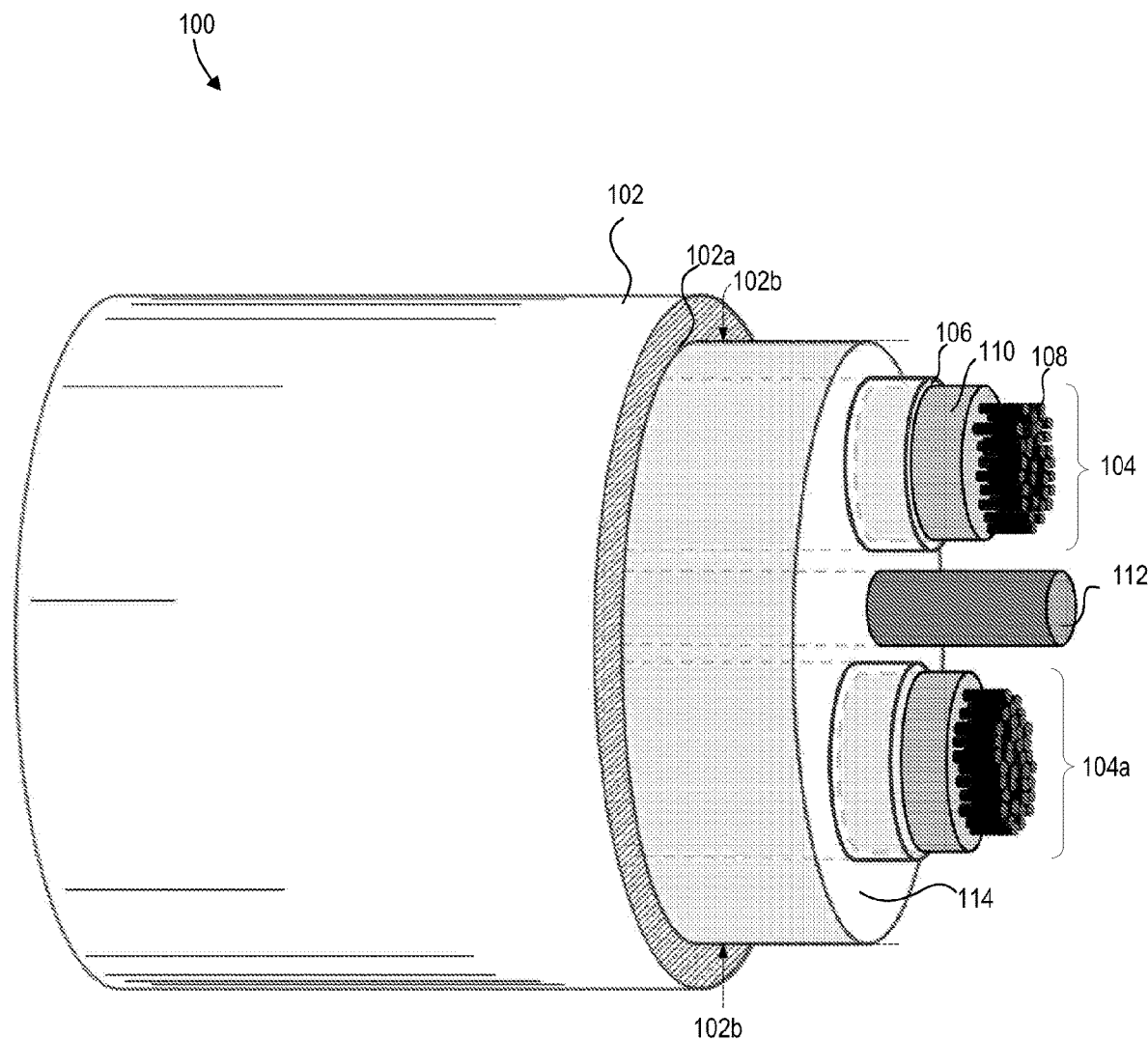
FIG. 1 shows an electrochemical device, in accordance with an exemplary embodiment of the present disclosure.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

As described above, a problem with electric flow devices is that the geometry limits the available power density. Efforts have been made to improve electric flow device energy density, however, for a classic flat-sheet membrane-based electric flow device, extra parts such as flow distributors are necessary to avoid void space in the electrodes, requiring increases to system volume and capital cost, all the while lowering the power density. Thus, it is imperative to change the geometry of electric flow devices to unleash greater power density. Electrochemical flow devices described herein can allow for elimination of extra battery parts. Furthermore, some electrochemical flow devices described herein increase the membrane surface area and provide increased power densities.

In some embodiments, the disclosed electrochemical device 100 can be an electrochemical cell, fuel cell, or a battery such as a redox flow battery.

In some embodiments, the disclosed electrochemical device 100 can comprise redox-active material configured to provide a flow of electrons while undergoing an oxidation-reduction reaction. In other words, a redox-active material facilitates the electrochemical reaction within the electrochemical device by acting as an electron source or an electron sink. As used herein, the term "redox-active material" refers to a material that facilitates the electrochemical reaction by acting as an electron source or an electron sink.

This design can be universal and applied to various common redox couples, including, but not limited to, zinc-based, vanadium-based, anthraquinone-based, and the like.

Furthermore, the high design flexibility of electrochemical devices disclosed herein can allow the devices to be directly used for in operando analysis.

Figure 2:
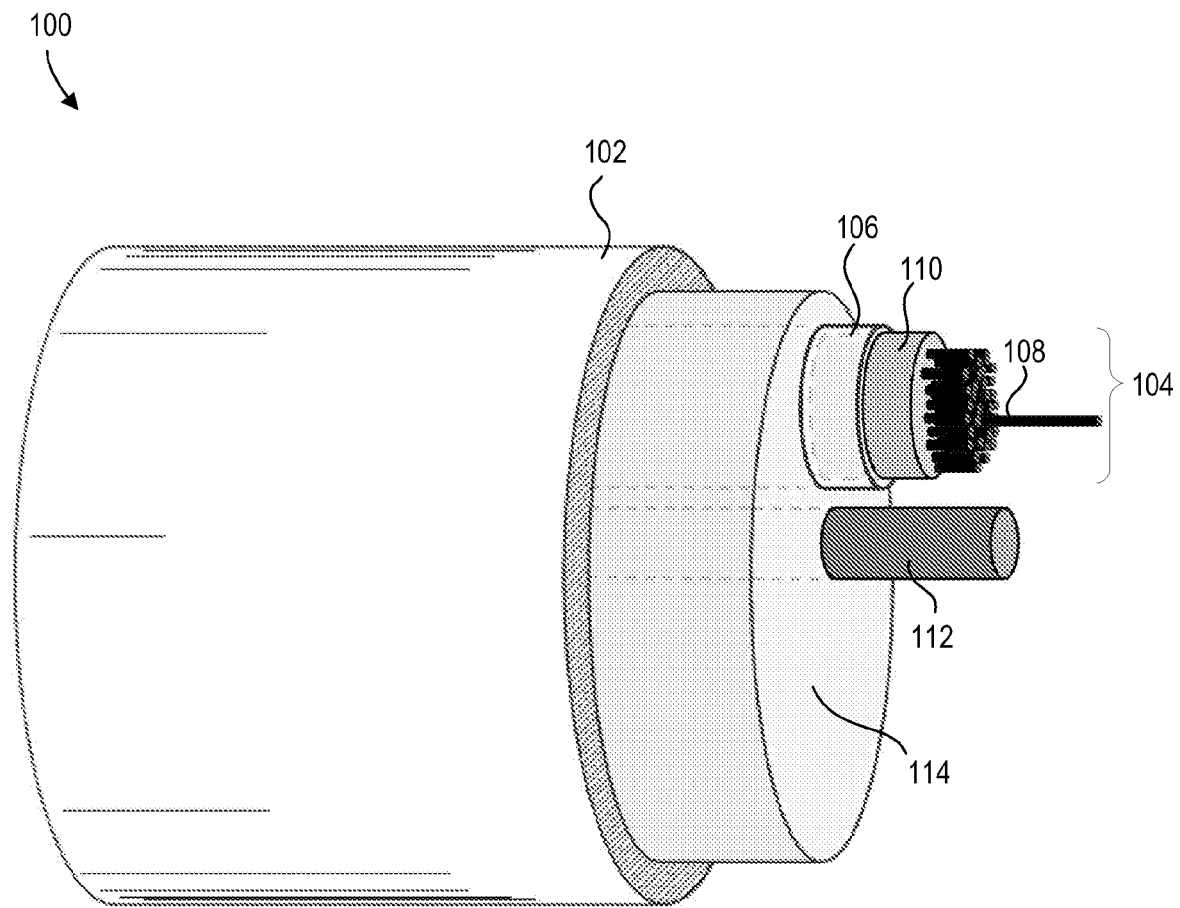
FIG. 2 shows a partially extended view of an electrochemical device, in accordance with an exemplary embodiment of the present disclosure.

As shown in FIGS. 1 and 2, some embodiments of the present disclosure provide an electrochemical device 100. The electrochemical device 100 can include a tube 102 comprising an outer surface 102a defining an interior volume 102b of the tube 102. The tube 102 can have many different cross-sectional shapes, including, but not limited to round, square, rectangular, hexagonal, octagonal, pentagonal, oval, triangular, D-shaped, and the like. The tube 102 can also have many different lengths. In some embodiments, the tube 102 can be adjusted from handheld to grid level applications. For example, in some embodiments, the tube 102 can have a length ranging from 1 cm to 20 ft. The tube 102 can also have many different cross-section areas along the length. In some embodiments, the cross-sectional area can vary along the length of the tube 102, such that the cross-sectional area at one location along the length of the tube 102 is greater than or lesser than the cross-sectional area at another location along the length of the tube 102. In some embodiments, the tube 102 can have many different wall thicknesses along the length. In some embodiments, the tube 102 can be adjusted from handheld to grid level applications. For example, in some embodiments, the tube 102 can have a wall thickness ranging from 0.10 mm to 0.65 in. The tube 102 can be made of many different materials, including, but not limited to, plastic, polymer, metal, glass, and combinations thereof. In some embodiments, the tube 102 can be flexible.

The electrochemical device 100 can further comprise a first hollow fiber 104. The first hollow fiber 104 can be positioned in the interior volume of the tube 102. The first hollow fiber 104 can be positioned at many different locations within the interior volume of the tube 102, in accordance with various embodiments. In some embodiments, the first hollow fiber 104 can be positioned along a longitudinal axis of the tube 102. The first hollow fiber 104 can also have many different lengths. For example, in some embodiments, the first hollow fiber 104 can be of a length greater than or lesser than the tube 102. The first hollow fiber 104 can also have many different cross-section areas along the length. In some embodiments, the cross-sectional area can vary along the length of the first hollow fiber 104, such that the cross-sectional area at one location along the length of the first hollow fiber 104 is greater than or lesser than the cross-sectional area at another location along the length of the first hollow fiber 104. In some embodiments, the first hollow fiber 104 can have many different wall thicknesses along the length.

In some embodiments, the disclosed electrochemical device 100 can comprise a second hollow fiber 104. In some embodiments, the disclosed electrochemical device 100 can comprise one or more hollow fibers 104a. The one or more hollow fibers 104a can be positioned in the interior volume of the tube 102. The one or more hollow fibers 104a can comprise a membrane 106, one or more first electrodes 108a, and a first electrolyte fluid 110, as described above. The membrane 106 can define an interior volume of the one or more hollow fibers 104a. The one or more first electrodes 108 can be positioned in the interior volume of the one or more hollow fibers 104a. The first electrolyte fluid 110 can be positioned in the interior volume of the one or more hollow fibers 104a. In some embodiments, the one or more second electrodes 112 can be positioned in the interior volume of the tube 102 and outside of the interior volume of the one or more hollow fibers 104a. The second electrolyte fluid 114 can be positioned in the interior volume of the tube 102 and outside of the interior volume of the one or more hollow fibers 104a.

In some embodiments, the first hollow fiber 104 can comprise a first membrane 106 defining an interior volume of the first hollow fiber 104. In some embodiments, the first membrane 106 can define the outer surface of the first hollow fiber 104. In some embodiments, the first membrane 106 can comprise an ion-exchange membrane, including, but not limited to a cation-exchange membrane, an anion-exchange membrane, a proton exchange membrane, a bipolar membrane, a charge mosaic membrane, and the like. The first membrane 106 can selectively transfer charge carrier ions and can maintain a charge balance between fluids, in accordance with various embodiments. The first membrane 106 can be constructed from a polymer or an ionomer, including, but not limited to polyethylene, polypropylene, polyfluoroethylene, perfluorosulfonate, polytetrafluoroethylene, sulfonated poly(arylene thioether ketone ketone), sulfonated poly(ether ether ketone), and the like. In some embodiments, the first membrane 106 can be constructed from co-polymers or co-ionomers, such as sulfonated tetrafluoroethylene monomer, perfluorinated monomer, perfluorosulfonic acid monomer, perfluorovinyl ether monomer, and combinations thereof. Suitable examples of membranes can include, but are not limited to, Nafion (Nafion (registered trademark) N-117, N-112, N-125, N-212) composed of a copolymer of perfluorosulfonic acid and polytetrafluoroethylene (PTFE), Teflon, and other commercially available membranes.

In some embodiments, the first hollow fiber 104 can further comprise one or more first electrodes 108. The one or more first electrodes 108 can be positioned in the interior volume of the first hollow fiber 104. The one or more first electrodes 108 can be positioned at many different locations within the interior volume of the first hollow fiber 104, in accordance with various embodiments. In some embodiments, the one or more first electrodes 108 can be positioned along a longitudinal axis of the first hollow fiber 104. In some embodiments, the one or more first electrodes 108 can have many different lengths. For example, in some embodiments, the one or more first electrodes 108 can be of a length greater than or lesser than the first hollow fiber 104. The one or more first electrodes 108 can also have many different cross-section areas along the length. In some embodiments, the cross-sectional area can vary along the length of the one or more first electrodes 108, such that the cross-sectional area at one location along the length of the one or more first electrodes 108 is greater than or lesser than the cross-sectional area at another location along the length of the one or more first electrodes 108. In some embodiments, one or more first electrodes 108 may be of different or of similar lengths from other first electrodes 108.

In some embodiments disclosed herein, the one or more first electrodes 108 can comprise a metal. The metal can be many different metals known in the art, including, but not limited to, lithium, beryllium, sodium, magnesium, aluminum, potassium, calcium, scandium, titanium, vanadium, chromium, manganese, iron, cobalt, nickel, copper, zinc, gallium, rubidium, strontium, yttrium, zirconium, niobium, molybdenum, technetium, ruthenium, rhodium, palladium, silver, cadmium, indium, tin, cesium, barium, lanthanum, cerium, hafnium, tantalum, tungsten, rhenium, osmium, iridium, platinum, gold, mercury, thallium, lead, bismuth, and the like.

In another embodiments, the disclosed one or more first electrodes 108 can be an electrically conductive non-metal. Suitable examples of non-metals can include, but are not limited to carbon, carbon nanotubes, carbon felt, carbon paper, carbon cloth, graphene, graphite, polydimethylsiloxane, silicon, germanium, polyimide, and the like.

In some embodiments, the disclosed one or more first electrodes 108 can be an electrically conductive organic material. Suitable examples of organic materials can include, but are not limited to quinone, diimide, quinoxaline, phenolic ether, thioether, viologen and the like.

In some embodiments, the first hollow fiber 104 can further comprise at least a first portion of a first electrolyte fluid 110. The first electrolyte fluid 110 can be positioned in the interior volume of the first hollow fiber 104. The first electrolyte fluid 110 can be positioned at many different locations within the interior volume of the first hollow fiber 104, in accordance with various embodiments. In some embodiments, the first electrolyte fluid 110 can be gas, liquid, aqueous, polymeric, semi-solid, and combinations thereof. Preferably, the first electrolyte fluid 110 is aqueous. In some embodiments, the first electrolyte fluid 110 can comprise ions 110a.

The electrochemical device 100 can further comprise one or more second electrodes 112. The one or more second electrodes 112 can be positioned in the interior volume of the tube 102 and outside of the interior volume of the first hollow fiber 104. In some embodiments, the one or more second electrodes 112 can be positioned in the interior volume of the tube 102 and outside of the interior volume of one or more hollow fibers 104a. The one or more second electrodes 112 can be positioned at many different locations within the interior volume of the tube 102 and outside of the interior volume of the one or more hollow fibers 104a, in accordance with various embodiments. In some embodiments, the one or more second electrodes 112 can be positioned along a longitudinal axis of the tube 102. The one or more second electrodes 112 can also have many different lengths. For example, in some embodiments, the one or more second electrodes 112 can be of a length greater than or lesser than the tube 102. The one or more second electrodes 112 can also have many different cross-section areas along the length. In some embodiments, the cross-sectional area can vary along the length of the one or more second electrodes 112, such that the cross-sectional area at one location along the length of the one or more second electrodes 112 is greater than or lesser than the cross-sectional area at another location along the length of the one or more second electrodes 112. In some embodiments, one or more second electrodes 112 may be of different or of similar lengths from other second electrodes.

In some embodiments, the second electrode 112 can comprise a metal, electrically conductive non-metal, or an electrically conductive organic material. Exemplary metals can include, but are not limited to, lithium, beryllium, sodium, magnesium, aluminum, potassium, calcium, scandium, titanium, vanadium, chromium, manganese, iron, cobalt, nickel, copper, zinc, gallium, rubidium, strontium, yttrium, zirconium, niobium, molybdenum, technetium, ruthenium, rhodium, palladium, silver, cadmium, indium, tin, cesium, barium, lanthanum, cerium, hafnium, tantalum, tungsten, rhenium, osmium, iridium, platinum, gold, mercury, thallium, lead, bismuth, and the like. Suitable examples of non-metals can include, but are not limited to carbon, carbon nanotubes, carbon felt, carbon paper, carbon cloth, graphene, graphite, polydimethylsiloxane, silicon, germanium, polyimide, and the like. Suitable examples of organic materials can include, but are not limited to, quinone, diimide, quinoxaline, phenolic ether, thioether, viologen and the like.

In some embodiments, the second electrode 112 can be substantially the same as the first electrode 108 described above. For example, the first electrode 108 and the second electrode 112 can both comprise a metal.

In some embodiments, the second electrode 112 can be substantially different from the first electrode 108. For example, the first electrodes 108 can be metal, and the second electrode 112 can be an electrically conductive non-metal or organic material. In another example, the second electrodes 112 can be metal, and the first electrode 108 can be an electrically conductive non-metal or organic material.

In some embodiments, the one or more first electrodes 108 and the one or more second electrodes 112 can comprise a redox-active material. In some embodiments, the one or more first electrodes 108 and the one or more second electrodes 112 can be a cathode or an anode. In other words, in some embodiments, the one or more first electrodes 108 can be a cathode and the one or more second electrodes 112 can be an anode. In some embodiments, the one or more first electrodes 108 can be an anode and the one or more second electrodes first electrodes 108 can be metal, and the second electrode 112 can be an electrically conductive non-metal or organic material 112 can be a cathode.

The electrochemical device 100 can further comprise a second electrolyte fluid 114. The second electrolyte fluid 114 can be positioned in the interior volume of the tube 102 and outside of the interior volume of the one or more hollow fibers 104a. The second electrolyte fluid 114 can be positioned at many different locations within the interior volume of the tube 102, in accordance with various embodiments. In some embodiments, the second electrolyte fluid 114 can be gas, liquid, aqueous, polymeric, semi-solid, and combinations thereof. Preferably, the second electrolyte fluid 114 is aqueous. In some embodiments, the second electrolyte fluid 114 can comprise ions 114a.

Figure 3A:
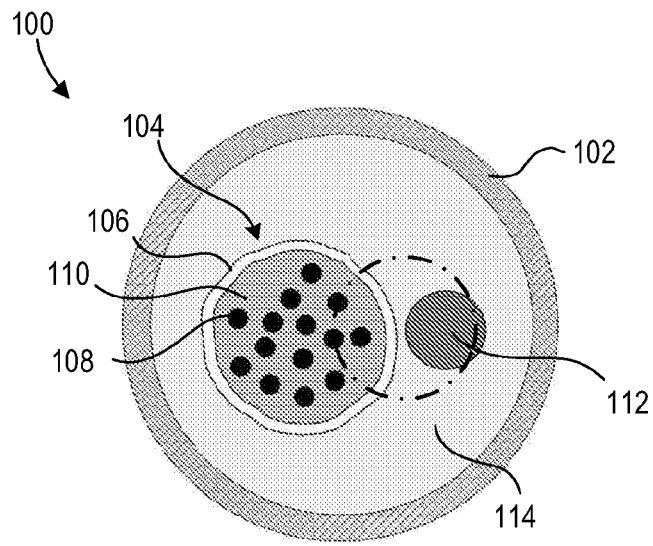
FIGS. 3A-3B show cross-sectional views an electrochemical device, in accordance with an exemplary embodiment of the present disclosure.
Figure 3B:
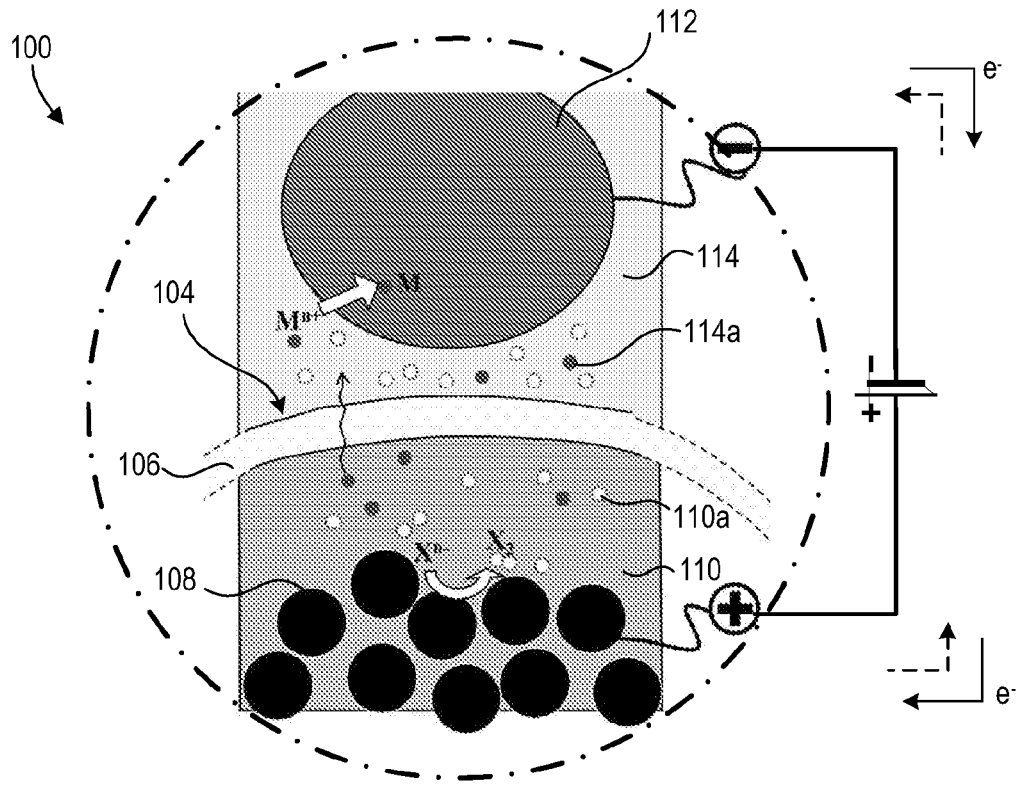

In some embodiments, the first electrolyte fluid 110 and the second electrolyte fluid 114 can comprise ions 110a, 114a. As shown in FIG. 3B, some embodiments of the present disclosure provide the first electrolyte fluid 110 and the second electrolyte fluid 114 can comprise ions 110a, 114a. Ions can be redox-active materials. In some embodiments, ions 110a, 114a can be metals, halides, organic compounds, and combinations thereof. Exemplary metals can include, but are not limited to, lithium, beryllium, sodium, magnesium, aluminum, potassium, calcium, scandium, titanium, vanadium, chromium, manganese, iron, cobalt, nickel, copper, zinc, gallium, rubidium, strontium, yttrium, zirconium, niobium, molybdenum, technetium, ruthenium, rhodium, palladium, silver, cadmium, indium, tin, cesium, barium, lanthanum, cerium, hafnium, tantalum, tungsten, rhenium, osmium, iridium, platinum, gold, mercury, thallium, lead, bismuth, and the like. As would be appreciated by one or ordinary skill in the art, ions 110a, 114a can be of the same or different metal as the one or more first electrodes 108 and/or the one or more second electrodes 112 and can be present in any amount to confer a desirable property to the device. Exemplary halides can include, but are not limited to, iodide, bromide, chloride, fluoride, and combinations thereof. Exemplary organic compounds can include, but are not limited to, quinone bromine, methyl viologen, viologen-containing polymers, anthraquinone, 9,10-anthraquinone-2,7-disulfonic acid (AQDS), 2,2,6,6,-tetramethylpiperidine-1-oxyl, and 4-methoxy-2,2,6,6-tetra-methylpiperidine-1-oxyl (TEMPO), 4-hydroxy-TEMPO, TEMPO radical-containing polymers, 2,5-di-tert-butyl-1,4-bis(2-methoxyethoxy)benzene, quinoxaline, quinoxaline derivatives, camphorquinone, and the like. As would be appreciated by one or ordinary skill in the art, ions 110a, 114a can be present in any amount to confer a desirable property to the device.

In some embodiments, the first electrolyte fluid 110 and/or the second electrolyte fluid 114 can be cathodic or anodic. In other words, in some embodiments, the first electrolyte fluid 110 can be cathodic, and the second electrolyte fluid 114 can be anodic. In some embodiments, the first electrolyte fluid 110 can be anodic, and the second electrolyte fluid 114 can be cathodic. As would be appreciated by one or ordinary skill in the art, the one or more first electrodes 108 can be chemically inert to the first electrolyte fluid 110 in the interior volume of the one or more hollow fibers 104a. Additionally, the one or more second electrodes 112 can be chemically inert to the second electrolyte fluid 114 in the interior volume of the tube 102 and outside of the interior volume of the one or more hollow fibers 104a. In some embodiments, the first electrolyte fluid 110 and/or the second electrolyte fluid 114 can be gas, liquid, aqueous, polymeric, semi-solid, and combinations thereof. In some embodiments, the first electrolyte fluid 110 and the second electrolyte fluid 114 are aqueous. As would be appreciated by one of ordinary skill in the art, the portion of the second electrolyte fluid 114 in the interior volume of the tube 102 can be positioned outside of the interior volume of the one or more hollow fibers 104a such that the first electrolyte fluid 110 and the second electrolyte fluid 114 do not mix. In some embodiments, the membrane 106 on the one or more hollow fibers 104a can allow for transfer of ions 110a, 114a between the first electrolyte fluid 110 and the second electrolyte fluid 114.

In some embodiments, the electrochemical device 100 can comprise redox-active materials. In other words, the redox-active materials can have a quick reaction rate during oxidation and reduction on the surfaces of the one or more first electrodes 108 and the one or more second electrodes 112.

As would be appreciated by one of ordinary skill in the art, redox-active materials can be selected using Pourbaix diagrams. In some embodiments, redox-active materials can be selected considering chemical stability as well as pH dependence.

Figure 4A:
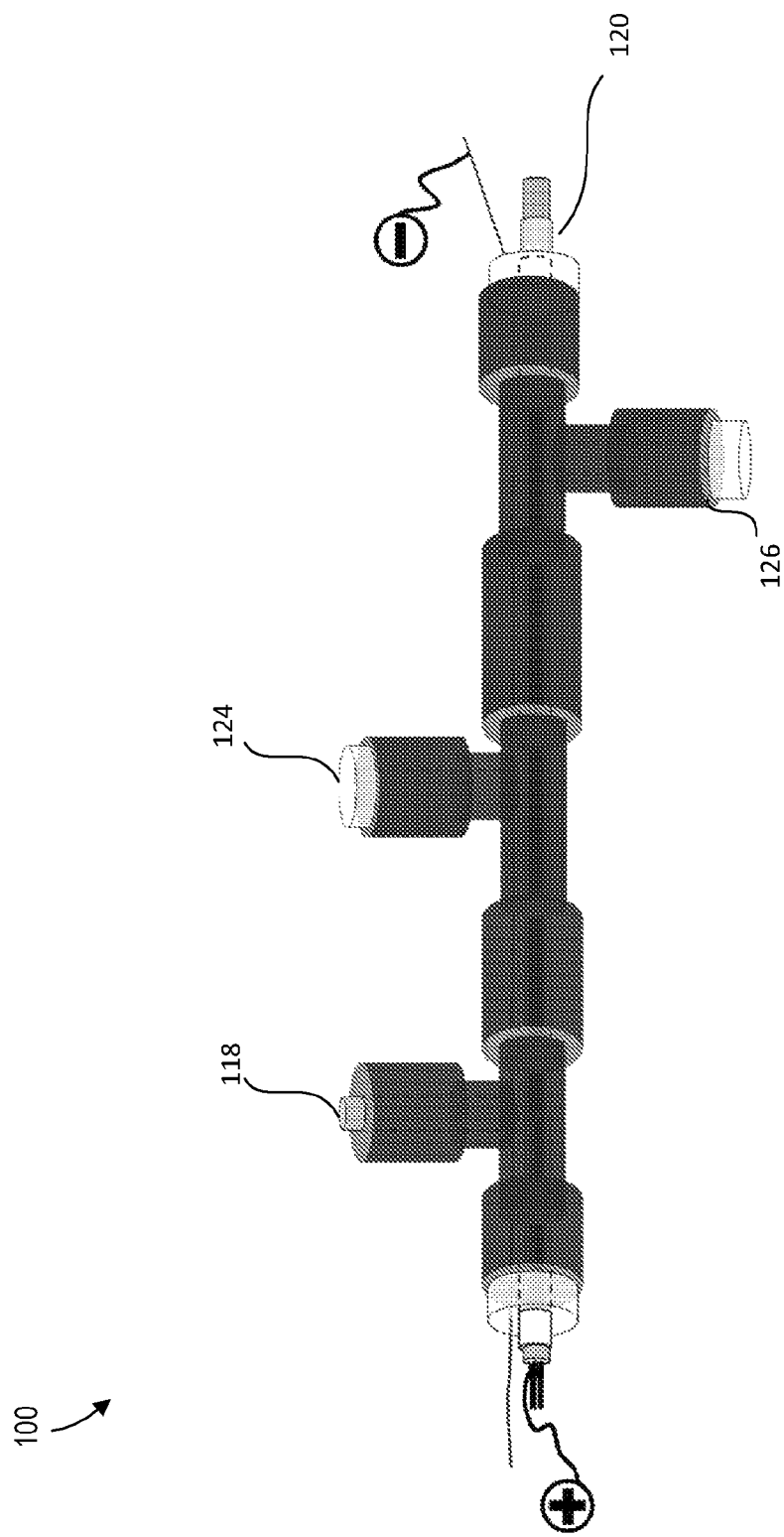
FIGS. 4A-4C show renderings of an exemplary embodiment of an electrochemical device, in accordance with an exemplary embodiment of the present disclosure.
Figure 4B:
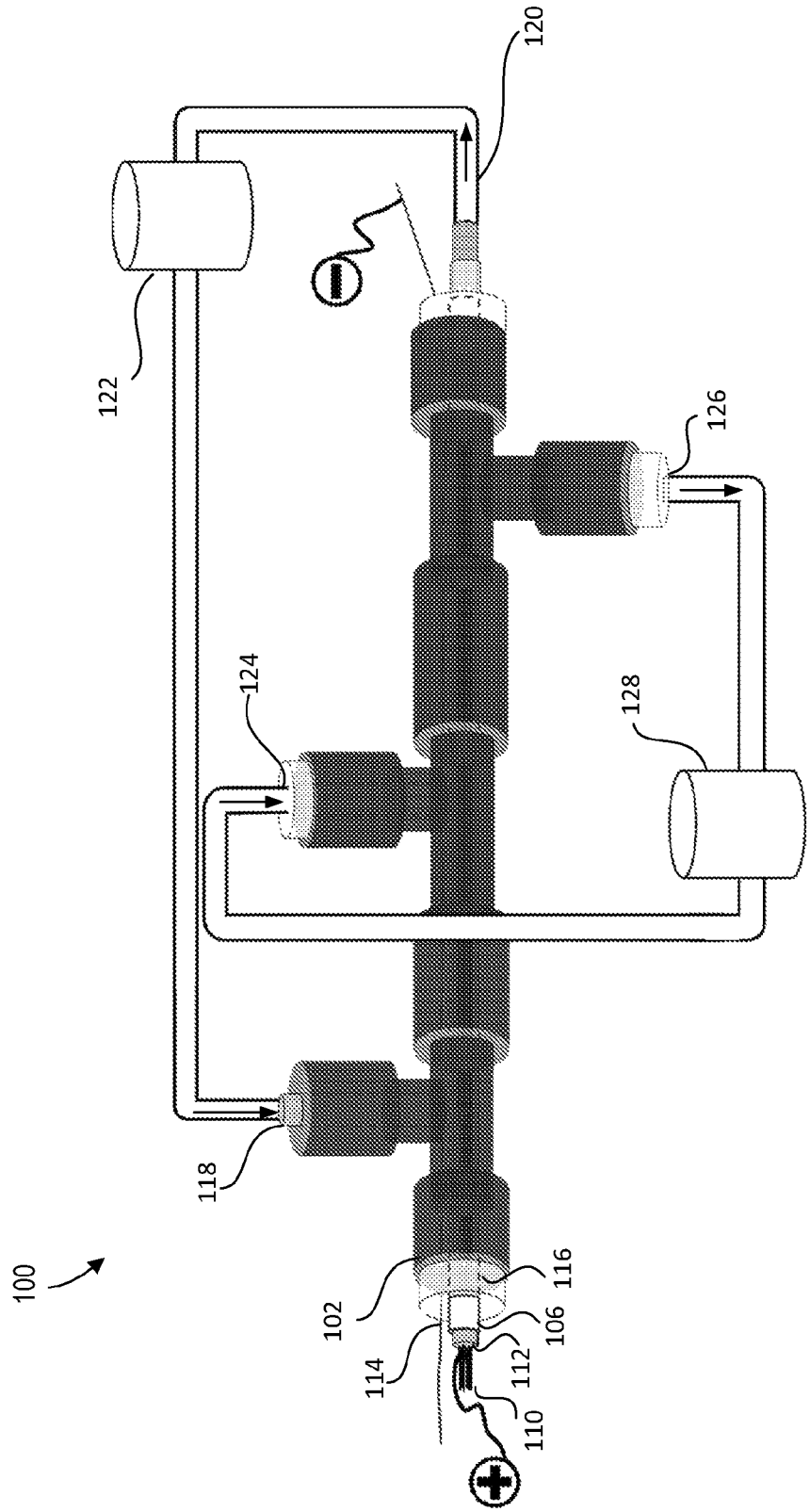
Figure 4C:
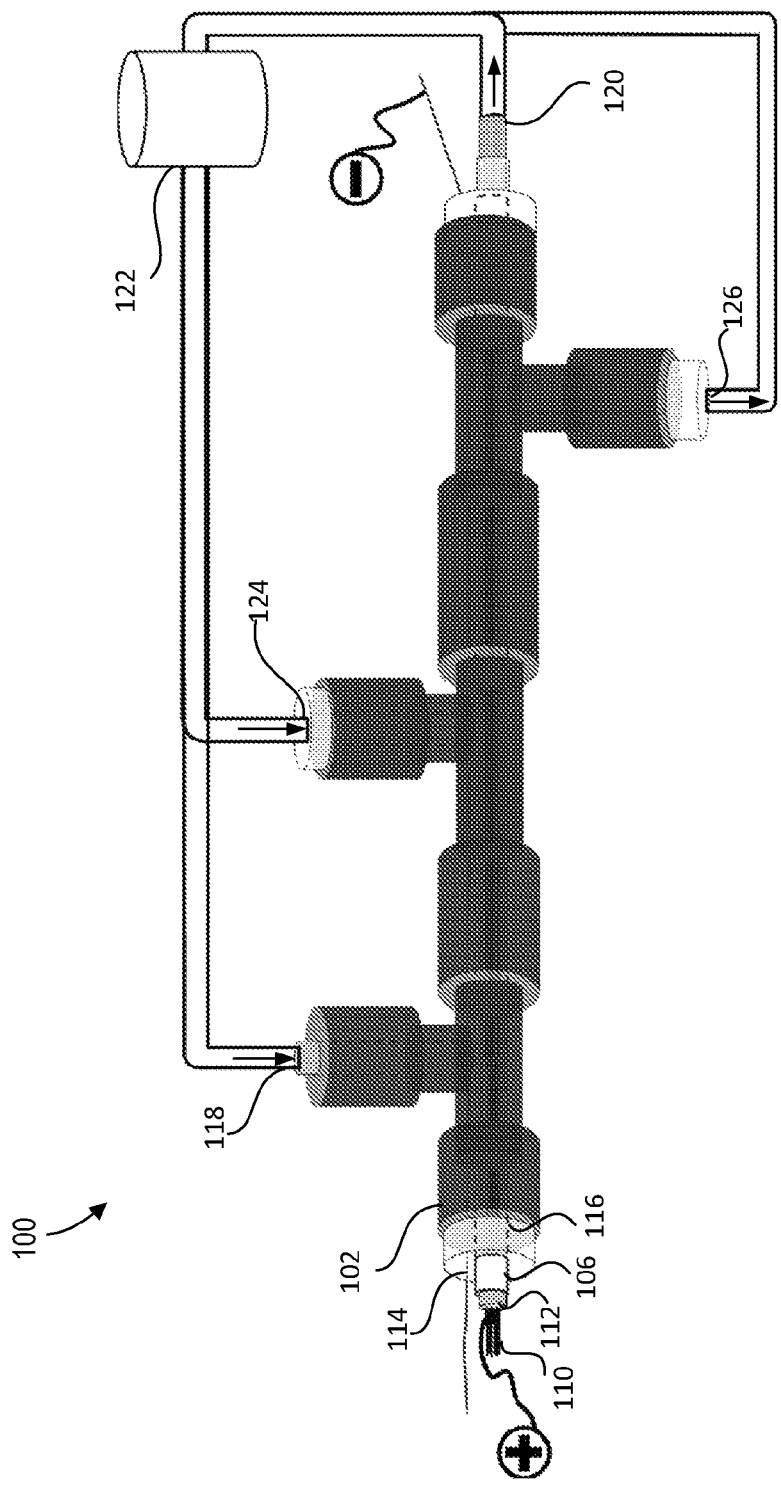

As shown in FIGS. 4A, 4B and 4C, some embodiments of the present disclosure provide an electrochemical device 100. In some embodiments disclosed herein, the electrochemical device 110 can comprise a first inlet 118. The first inlet 118 can be in fluid communication with the interior volume of the one or more hollow fibers 104a. The first inlet 118 can be configured to flow the first electrolyte fluid 110 into the interior volume of the one or more hollow fibers 104a. The first inlet 118 can be positioned to couple with the one or more hollow fibers 104a anywhere along the length of the one or more hollow fibers 104a. In some embodiments, the first inlet 118 can be configured to couple to a means for flowing the first electrolyte fluid 110, such as a hose, channel, pipe, conduit or the like.

In some embodiments as disclosed herein, the electrochemical device can comprise a first outlet 120. The first outlet 120 can be in fluid communication with the interior volume of the one or more hollow fibers 104a. The first outlet 120 can be configured to flow the first electrolyte fluid 110 into the interior volume of the one or more hollow fibers 104a. The first outlet 120 can be positioned to couple with the one or more hollow fibers 104a anywhere along the length of the one or more hollow fibers 104a. The first outlet 120 can have many different cross-section areas. The first outlet 120 can be configured to couple to a means for flowing the first electrolyte fluid 110, such as a hose, channel, pipe, conduit or the like.

As shown in FIGS. 4B and 4C, some embodiments of the present disclosure provide a first electrolyte fluid reservoir 122. The first electrolyte fluid reservoir 122 can be configured to store a first electrolyte fluid 110. In another embodiment, the first electrolyte fluid reservoir 122 can be configured to circulate or flow the first electrolyte fluid 110 into the interior volume of the one or more hollow fibers 104a through the first inlet 118. In another embodiment, the first electrolyte fluid reservoir 122 can be configured to circulate or flow the first electrolyte fluid 110 from the interior volume of the one or more hollow fibers 104a from the first outlet 120 and into the first electrolyte fluid reservoir 122. In some embodiments, first electrolyte fluid reservoir 122 can be configured to couple to a means for flowing the first electrolyte fluid 110, such as a hose, channel, pipe, conduit or the like.

As shown in FIGS. 4A, 4B and 4C, in some embodiments disclosed herein, the electrochemical device 100 can comprise a second inlet 122. The second inlet 122 can be in fluid communication with the interior volume of the tube 102. The second inlet 122 can be configured to flow the second electrolyte fluid 114 into the interior volume of the tube 102. The second inlet 122 can be positioned to couple with the tube 102 anywhere along the length of the tube 102. In some embodiments, the second inlet 122 can be configured to couple to a means for flowing the second electrolyte fluid 114, such as a hose, channel, pipe, conduit or the like.

In some embodiments as disclosed herein, the electrochemical device 100 can comprise a second outlet 124. The second outlet 124 can be in fluid communication with the interior volume of the tube 102. The second outlet 124 can be configured to flow the second electrolyte fluid 114 out of the interior volume of the tube 102. The second outlet 124 can be positioned to couple with the tube 102 anywhere along the length of the tube 102. The second outlet 124 can have many different cross-section areas. The second outlet 124 can be configured to couple to a means for flowing the second electrolyte fluid 114, such as a hose, channel, pipe, conduit or the like.

As shown in FIG. 4B, in some embodiments of the present disclosure, the electrochemical device 100 can comprise a second electrolyte fluid reservoir 126. The second electrolyte fluid reservoir 126 can be configured to store a second electrolyte fluid 114. In another embodiment, the second electrolyte fluid reservoir 126 can be configured to circulate or flow the second electrolyte fluid 114 into the interior volume of the tube 102 through the second inlet 122. In another embodiment, the second electrolyte fluid reservoir 126 can be configured to circulate or flow the second electrolyte fluid 114 from the interior volume of tube 102 from the second outlet 124 and into the second electrolyte fluid reservoir 126. In some embodiments, second electrolyte fluid reservoir 126 can be configured to couple to a means for flowing the second electrolyte fluid 114, such as a hose, channel, pipe, conduit or the like.

As shown in FIG. 4C, some embodiments of the present disclosure provide a first electrolyte fluid reservoir 122 can be configured to circulate or flow the first electrolyte fluid 110 into the interior volume of the one or more hollow fibers 104a, or into the interior volume of the tube 102 through the first inlet 118 and the second inlet 122, respectively. The first electrolyte fluid reservoir 122 can be configured to circulate or flow the first electrolyte fluid 110 from the interior volume of the one or more hollow fibers 104a and from the interior volume of from the tube 102 through the first outlet 120 and the second outlet 124, respectively, and into the first electrolyte fluid reservoir 122.

In some embodiments of the present disclosure, the electrochemical device 100 may comprise one or more pumps. The pumps can be configured to circulate or flow the first electrolyte fluid 110 and/or the second electrolyte fluid 114 through the interior volumes of the one or more hollow fibers 104a and the tube 102, respectively.

In some embodiments of the present disclosure, the one or more first electrodes 108 and the one or more second electrodes 112 can be configured to connect to an external circuit connect, as shown in FIG. 3B. In another embodiment, the one or more first electrodes 108 and the one or more second electrodes 112 can be configured to connect to an external current collector.

Figure 5:
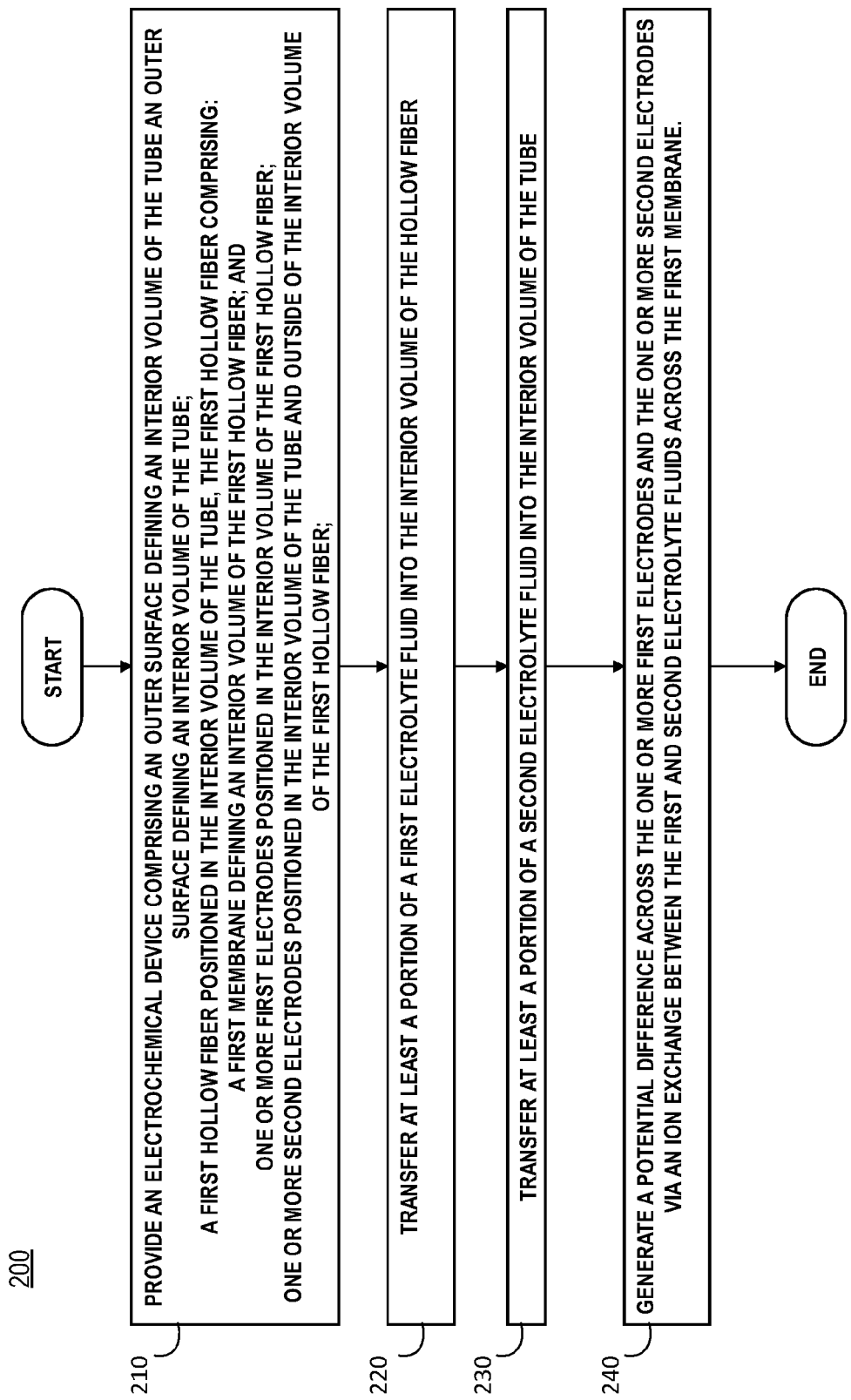
FIG. 5 is a flowchart of a method for making an electrochemical device, in accordance with an exemplary embodiment of the present disclosure.
Figure 6:
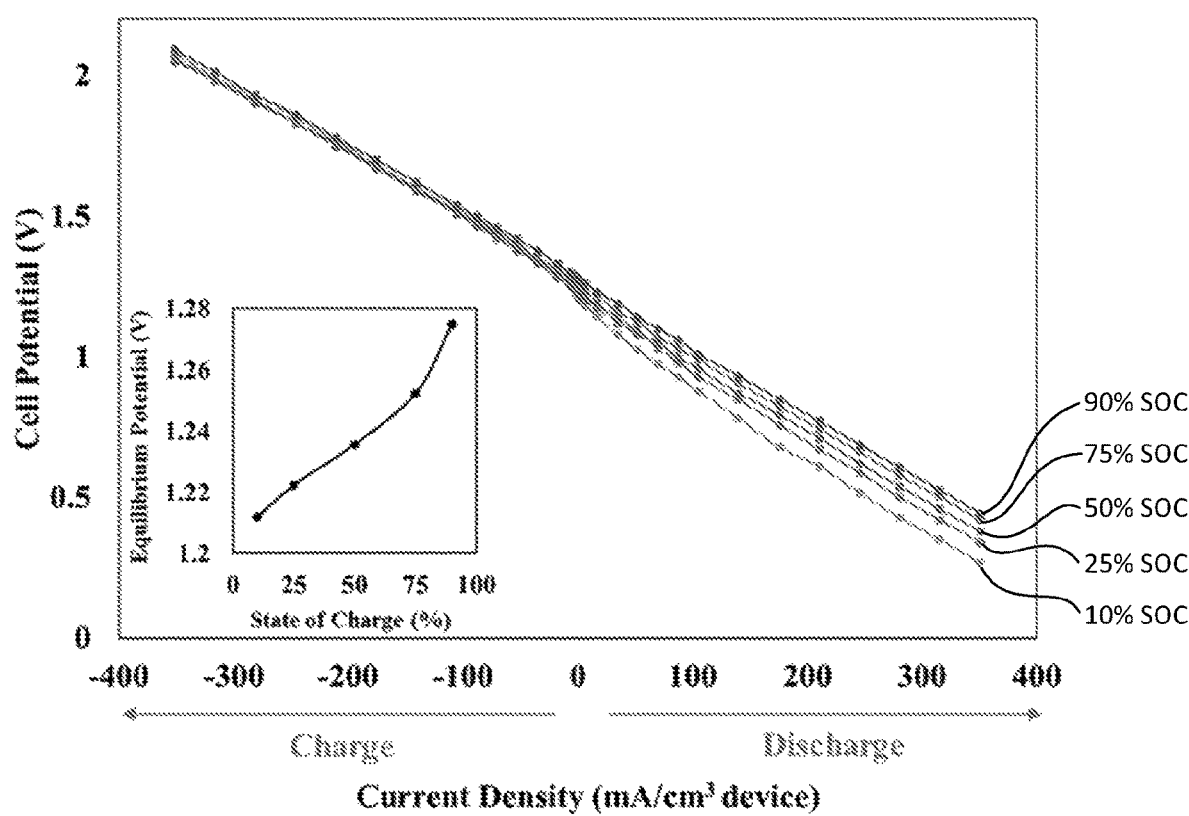
FIG. 6 shows a plot of the cell potential (V) versus current density (mA/cm$^3$) of an electrochemical device, in accordance with an exemplary embodiment of the present disclosure.
Figure 7:
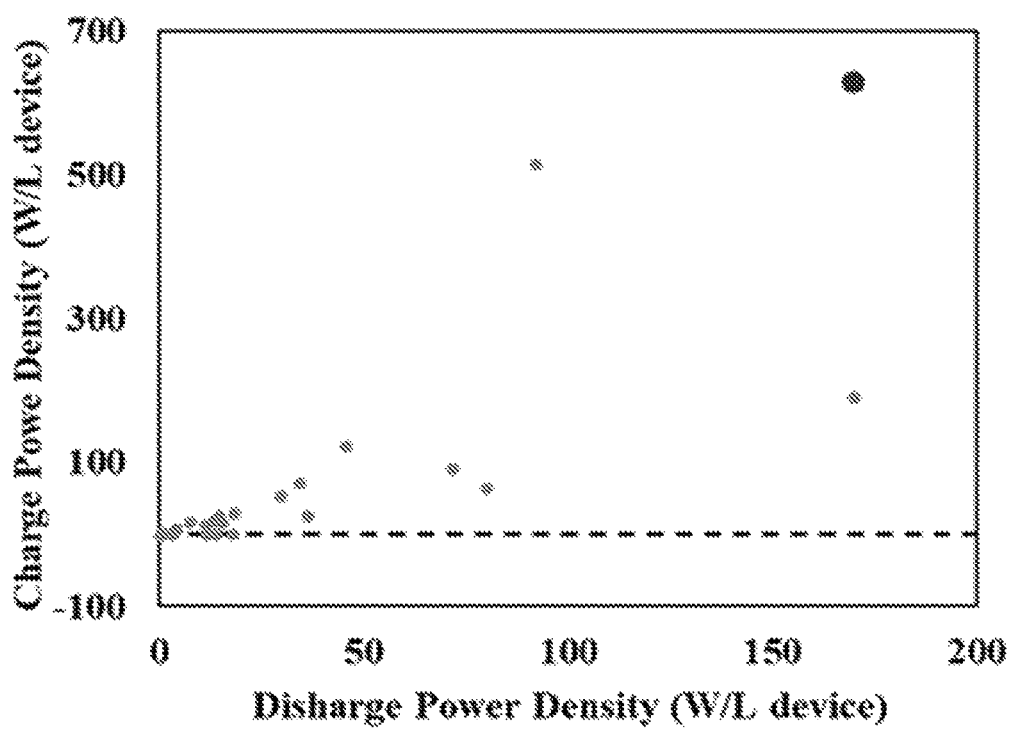
FIG. 7 shows a plot of charge power density (W/L) versus discharge power density (W/L) of an electrochemical device, in accordance with an exemplary embodiment of the present disclosure.
Figure 8:
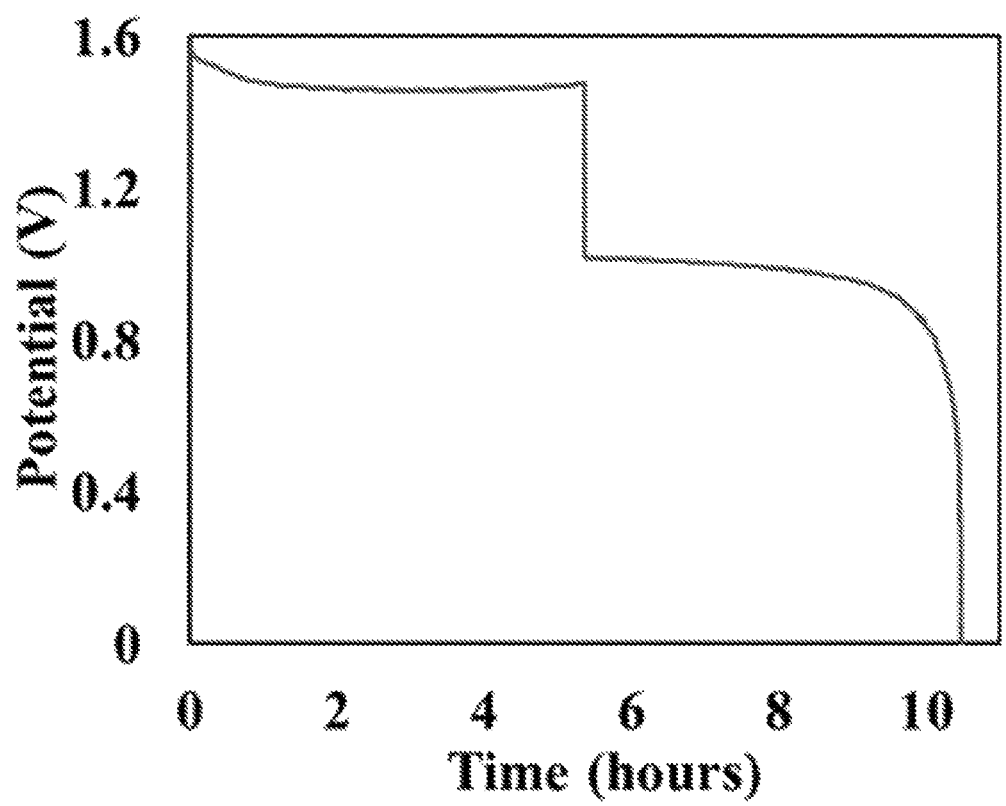
FIG. 8 shows a plot of potential (V) versus time (hours) of an electrochemical device, in accordance with an exemplary embodiment of the present disclosure.
Figure 9:
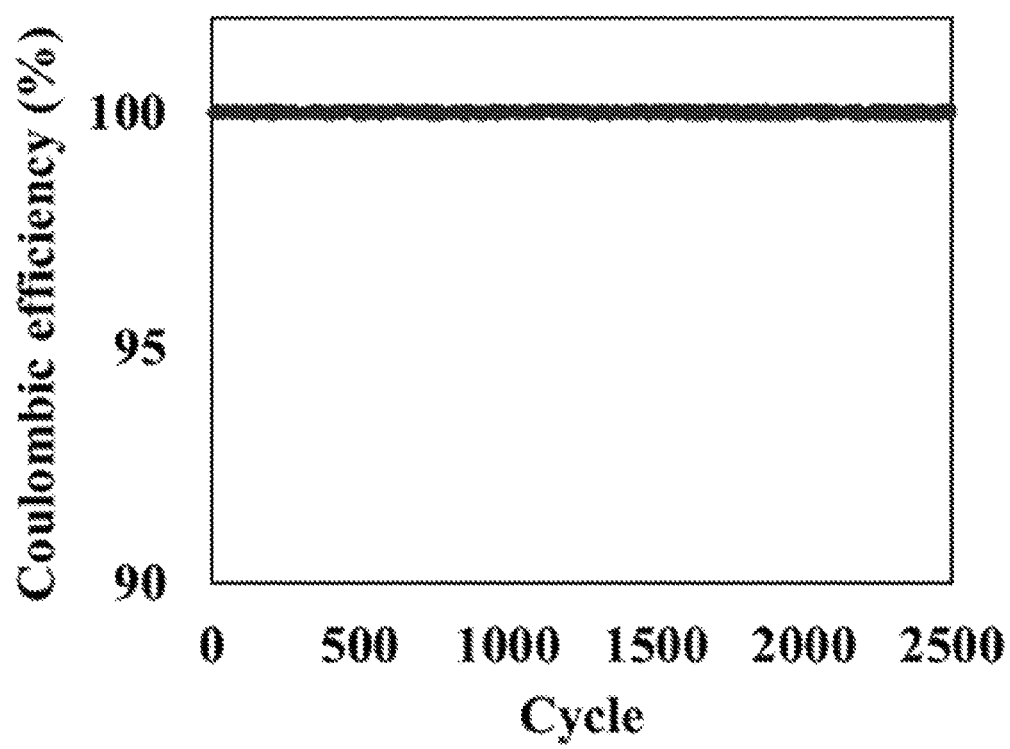
FIG. 9 shows a plot of Coulombic efficiency (%) versus cycle of an electrochemical device, in accordance with an exemplary embodiment of the present disclosure.
Figure 10:
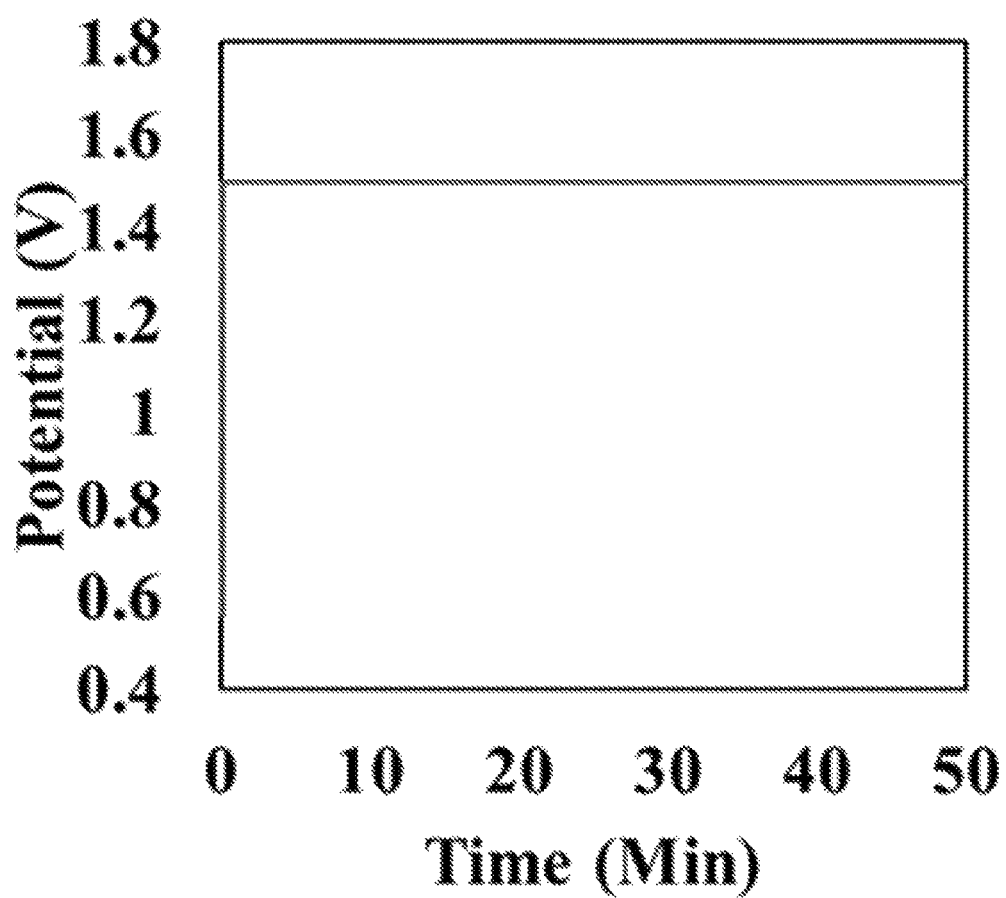
FIG. 10 shows a plot of potential (V) versus time (min) of an electrochemical device, in accordance with an exemplary embodiment of the present disclosure.
Figure 11:
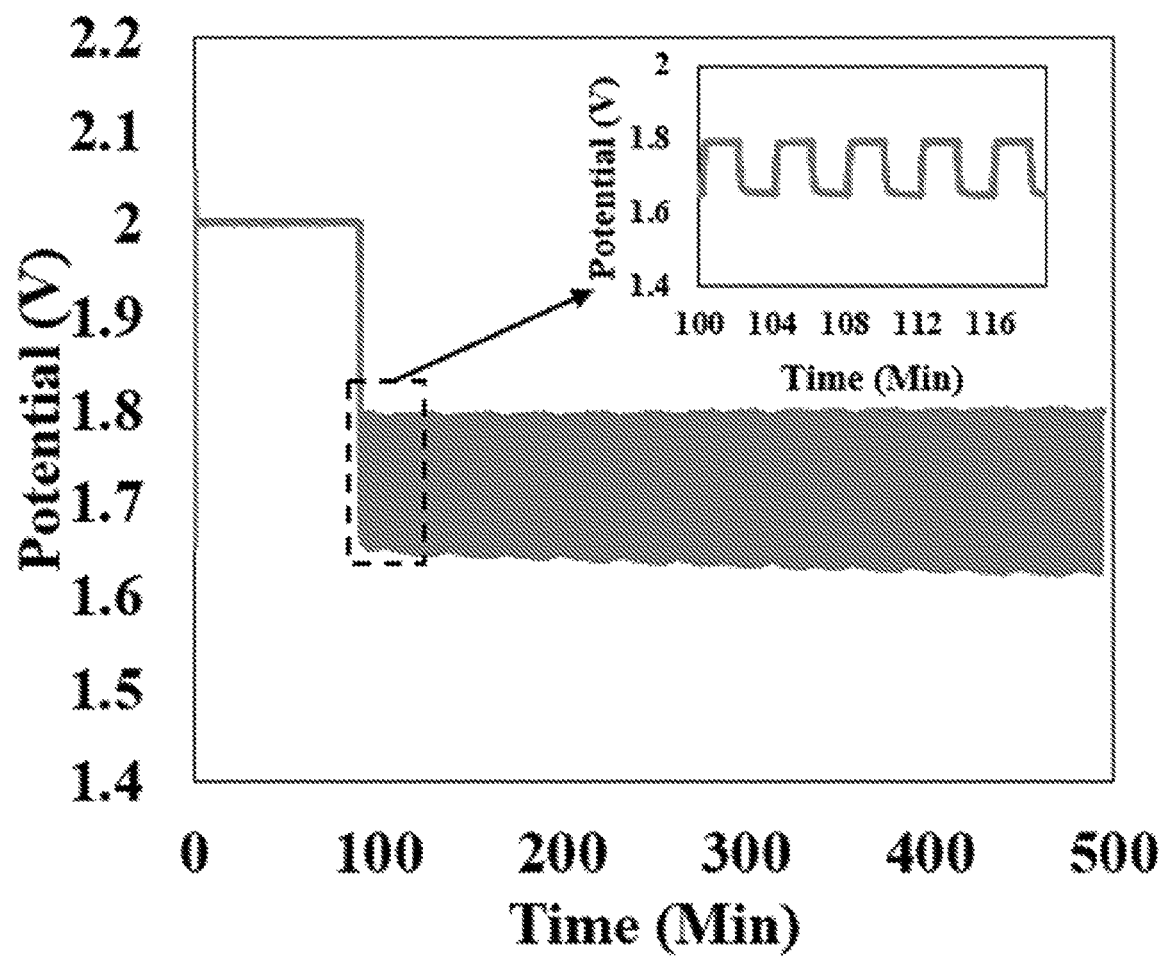
FIG. 11 shows a plot of potential (V) versus time (min) of an electrochemical device, in accordance with an exemplary embodiment of the present disclosure.

FIG. 5 is a flowchart of a method 200 for making an electrochemical device, in accordance with some embodiments herein. In some embodiments, as show in block 210, the method 200 can comprise providing an electrochemical device having a tube with an outer surface, a first hollow fiber, one or more first electrodes, one or more second electrodes, a first electrolyte fluid, and a second electrolyte fluid. The first hollow fiber can comprise a membrane. The membrane can define an interior volume of the first hollow fiber. The one or more first electrodes can be positioned in the interior volume of the first hollow fiber. The one or more second electrodes can be positioned in the interior volume of the tube and outside of the interior volume of the first hollow fiber. The first electrolyte fluid can be positioned in the interior volume of the first hollow fiber. The second electrolyte fluid can be positioned in the interior volume of the tube and outside of the interior volume of the first hollow fiber.

In some embodiments, as shown in block 220, the method 200 can also comprise transferring a first electrolyte fluid into the first hollow fiber. In some embodiments, the method 200 can comprise transferring a portion of the first electrolyte fluid into the interior volume of the hollow fiber. In some embodiments, the first electrolyte fluid can be transferred using a pump, negative pressure, gravity, and the like.

In some embodiments, as shown in block 230, the method 200 can also comprise transferring a second electrolyte fluid into the tube. In some embodiments, the method 200 can comprise transferring a portion of a second electrolyte fluid into the interior volume of the tube, outside of the interior volume of the first hollow fiber. In some embodiments, the second electrolyte fluid can be transferred using a pump, negative pressure, gravity, and the like.

In some embodiment, the transferring can be continuous and/or periodic flow.

In some embodiments, as shown in block 240, the method 200 can further comprise generating a potential difference. In some embodiments, the method 200 can comprise generating a potential difference between the first and second electrolyte fluids across the first membrane. In some embodiments, a potential difference can be generated when the first membrane selectively transfers charge carrier ions from the first electrolyte fluid from the second electrolyte fluid, and visa-versa. In another embodiment, the potential difference can be increased by altering the concentration of ions in the first electrolyte fluid or the second electrolyte fluid. In yet another embodiment, the potential difference can be decreased by balancing the charge carrier ions between the first electrolyte fluid and the second electrolyte fluid.

In some embodiments, the electrochemical device can be configured to connect with a second electrochemical device. In some embodiments, the connection can be electrical. In some embodiments, the connection can be fluid. In some embodiments, the electrochemical devices may be configured to connect with a second electrochemical device in a parallel connection, serial connection, stacked connection, and combinations thereof.

According to some embodiments, the components of the presently disclosed electrochemical device can be present in any amount to confer a desirable property to the device. In some embodiments, the device can present a Coulombic efficiency of 99% or greater (e.g., 99.05% or greater, 99.1% or greater, 99.15% or greater, 99.2% or greater, 99.25% or greater, 99.3% or greater, 99.35% or greater, 99.4% or greater, 99.45% or greater, 99.5% or greater, 99.55% or greater, 99.6% or greater, 99.65% or greater, 99.7% or greater, 99.75% or greater, 99.8% or greater, 99.85% or greater, 99.9% or greater, or 99.95% or greater). In some embodiments, the electrochemical device can present a specific capacity of 500 mAh/g or greater (e.g., 600 mAh/g or greater, 700 mAh/g or greater, 800 mAh/g or greater, 900 mAh/g or greater, 1000 mAh/g or greater, 2000 mAh/g or greater, 3000 mAh/g or greater, or 4000 mAh/g or greater). As would be appreciated by one of ordinary skill in the art, such an embodiment would provide for high capacity electrochemical devices viable for large-scale industrial use, rivaling the performance of currently used electrochemical devices.

As used herein, the term "cycle" or "cycles" shall refer to the period of time for an electrochemical device to exhaust its potential and recharge to a maximum rechargeable potential. In some embodiments, the electrochemical device can present a stable capacity retention of 75% or greater (e.g., 80% or greater, 85% or greater, 90% or greater, or 95% or greater) after 100 cycles. In some embodiments, the electrochemical device can present a specific capacity change of 5% or less (e.g., 4% or less, 3% or less, 2% or less, or 1% or less) after 200 cycles. In some embodiments, the electrochemical device can undergo a volume change of 40% or less (e.g., 35% or less, 30% or less, 25% or less, 20% or less, 15% or less, 10% or less, 9% or less, 8% or less, 7% or less, 6% or less, 5% or less, 4% or less, 3% or less, 2% or less, or 1% or less) after 100 cycles. As would be appreciated by one or ordinary skill in the art, such an embodiment would provide an electrochemical device with increased power density, rivaling the performance of currently used electrochemical devices.

The following examples further illustrate aspects of the present disclosure. However, they are in no way a limitation of the teachings or disclosure of the present disclosure as set forth herein.

EXAMPLES

The following examples are provided by way of illustration but not by way of limitation.

Example 1

Materials and Methods

A battery module consists of three compression tube fittings (⅛" outside diameter, McMaster-Carr) connected by polytetrafluoroethylene (PTFE) tubing (0.095" inside diameter, McMaster-Carr). A zinc wire (0.25 mm diameter, GoodfellowUSA) is inserted into the tube fitting as the anode on the shell side. On the bore side, 0.2 g carbon fiber (Fibre Glast) are inserted into four Nafion hollow fiber membranes (0.03" outside diameter, Perma Pure) as the cathode and serves as the bore side. Connection sections are sealed with Epoxy (J-B Weld) to prevent leaking and shell and bore side electrolyte from mixing. Copper foils (Alfa Asear) are attached to the end of the electrodes to serve as current collectors and silver paste (MTI Corp) is applied to the junctions.

Example 2

Materials and Methods

For organic and vanadium battery modules, a battery module consists of three compression tube fittings (⅛" outside diameter, McMaster-Carr) connected by polytetrafluoroethylene (PTFE) tubing (0.095" inside diameter, McMaster-Carr). A titanium wire (0.25 mm diameter, GoodfellowUSA) is inserted into the tube fitting as the anode on the shell side. On the bore side, 0.2 g carbon fiber (Fibre Glast) are inserted into two Nafion hollow fiber membranes. The middle tube fitting can be exchanged for a glass tubing for in operando analysis.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. An electrochemical device comprising:
   a tube having an interior tubular volume and comprising:
      a tubular electrolyte fluid suffusing the interior tubular volume;
      a hollow fiber having one or more first solid electrodes extending through an interior fiber volume of the hollow fiber, the hollow fiber having a submillimeter outside diameter and extending through the interior tubular volume, the interior fiber volume without direct contact with the tubular electrolyte fluid; and
      a second solid electrode extending at least a portion through the interior tubular volume and in direct contact with the tubular electrolyte fluid;
   wherein the hollow fiber further comprises:
      an electrolyte impervious membrane separating the interior fiber volume from direct contact with the tubular electrolyte fluid; and
      a hollow fiber electrolyte fluid suffusing in the interior fiber volume;
   wherein the one or more first solid electrodes are in direct contact with the hollow fiber electrolyte fluid;
   wherein each of the first and second solid electrodes has both a uniform diameter and is of solid form throughout a full length of the solid electrode;
   wherein a sealing at each end of the interior tubular volume contains the tubular electrolyte fluid within the interior tubular volume and ensures there is no mixing of the tubular electrolyte fluid and the hollow fiber electrolyte fluid in the electrochemical device; and
   wherein the hollow fiber extends through each end of the interior tubular volume, such that only the hollow fiber electrolyte fluid is both inside and outside the interior tubular volume.

2. The electrochemical device of claim 1 further comprising:
   one or more additional hollow fibers;
   one or more additional second solid electrodes;
   wherein:
      the membrane is a NAFION membrane;
      the hollow fiber electrolyte fluid is a first electrolyte fluid;

the tubular electrolyte fluid is a second electrolyte fluid;
a first inlet in fluid communication with the interior fiber volume is configured to enable a flow of the first electrolyte fluid from a first electrolyte fluid reservoir into the interior fiber volume;
a second inlet in fluid communication with the interior tubular volume is configured to enable a flow of the second electrolyte fluid from a second electrolyte fluid reservoir into the interior tubular volume of the tube; wherein
a first outlet in fluid communication with the interior fiber volume is configured to enable the flow of the first electrolyte fluid from the interior fiber volume into the first electrolyte fluid reservoir; and
a second outlet in fluid communication with the interior tubular volume is configured to enable the flow of the second electrolyte fluid from the interior tubular volume of the tube into the second electrolyte fluid reservoir.

3. The electrochemical device of claim 2, wherein at least a portion of the tube and at least a portion of the hollow fiber are coaxial.

4. The electrochemical device of claim 1, wherein the membrane is an ion-exchange membrane.

5. The electrochemical device of claim 4, wherein:
the membrane is selected from the group consisting of a cation-exchange membrane and an anion-exchange membrane;
the electrochemical device presents peak charge and discharge power densities of >600 W/L and >150 W/L, respectively.

6. An electrochemical device comprising:
a tube comprising:
a set of first hollow fibers, each hollow fiber having a submillimeter outside diameter and positioned in an interior volume of the tube, each of the first hollow fibers comprising:
a first membrane defining an interior volume of the first hollow fiber;
a set of first solid electrodes positioned in the interior volume of the first hollow fiber; and
at least a first portion of a first electrolyte fluid positioned in the interior volume of the first hollow fiber;
a set of second solid electrodes positioned in the interior volume of the tube and outside of the interior volume of each of the first hollow fibers; and
a second electrolyte fluid suffusing the interior volume of the tube;
wherein, with the interior volume of each of the first hollow fibers without direct contact with the second electrolyte fluid via the first membranes, and with a sealing of interior volume of the tube to contain the second electrolyte fluid, there is no mixing of the first electrolyte fluid and the second electrolyte fluid in the electrochemical device;
wherein the first membrane of the first hollow fiber comprises a copolymer selected from the group consisting of sulfonated tetrafluoroethylene monomer, perfluorinated monomer, perfluorosulfonic acid monomer, perfluorovinyl ether monomer, and combinations thereof;
wherein the first solid electrodes are longitudinally oriented in the interior volume of the first hollow fiber;
wherein each of the first and second solid electrodes has both a uniform diameter and is of solid form throughout a full length of the solid electrode; and
wherein the second solid electrodes are longitudinally oriented in the interior volume of the tube and in direct contact with the second electrolyte fluid.

7. The electrochemical device of claim 6, wherein the first solid electrodes and the second solid electrodes comprise a metal.

8. The electrochemical device of claim 7, wherein the metal is selected from the group consisting of lithium, beryllium, sodium, magnesium, aluminum, potassium, calcium, scandium, titanium, vanadium, chromium, manganese, iron, cobalt, nickel, copper, zinc, gallium, rubidium, strontium, yttrium, zirconium, niobium, molybdenum, technetium, ruthenium, rhodium, palladium, silver, cadmium, indium, tin, cesium, barium, lanthanum, cerium, hafnium, tantalum, tungsten, rhenium, osmium, iridium, platinum, gold, mercury, thallium, lead, bismuth, and combinations thereof.

9. The electrochemical device of claim 6, wherein the first solid electrodes and the second solid electrodes comprise a non-metal.

10. The electrochemical device of claim 9, wherein the non-metal is selected from the group consisting of carbon, carbon nanotubes, carbon felt, carbon paper, carbon cloth, graphene, graphite, polydimethylsiloxane, polyimide, and combinations thereof.

11. The electrochemical device of claim 6, wherein the first solid electrodes and the second solid electrodes comprise an organic material.

12. The electrochemical device of claim 11, wherein the organic material is selected from the group consisting of quinone, diimide, quinoxaline, phenolic ether, thioether, and viologen.

13. The electrochemical device of claim 6, wherein each of the first electrolyte fluid and the second electrolyte fluid is selected from the group consisting of being aqueous, cathodic, and anodic.

14. The electrochemical device of claim 6, wherein:
the electrochemical device is a battery; and
the battery presents at least one of:
a peak charge and discharge power densities of >600 W/L and >150 W/L, respectively;
a Coulombic efficiency of 99% or greater;
a specific capacity of 500 mAh/g or greater;
a stable capacity retention of 75% or greater after 100 cycles, wherein each cycle is a period of time for the battery to exhaust its potential and recharge to a maximum rechargeable potential;
a specific capacity change of 5% or less; or
a volume change of 40% or less.

15. An electrochemical device comprising:
a tube having a cap end volume and an interior tubular volume and comprising:
a tubular electrolyte fluid suffusing the interior tubular volume;
hollow fibers, each hollow fiber:
having first solid electrodes extending through an interior fiber volume of the hollow fiber, the interior fiber volume without direct contact with the tubular electrolyte fluid;
having a submillimeter outside diameter; and
extending through the interior tubular volume and at least partially into the cap end volume;
second solid electrodes, each second solid electrode:
extending at least a portion through the interior tubular volume without extending into the cap end volume; and in direct contact with the tubular electrolyte fluid; and a sealing system comprising:
an end seal at each end of the interior tubular volume to contain the tubular electrolyte fluid within the interior tubular volume; and
a cap seal at an end of the tube to contain a hollow fiber electrolyte fluid between the cap seal and the respective end seal in proximity to the cap seal;

wherein each hollow fiber further comprises:
an electrolyte impervious membrane separating the interior fiber volume from direct contact with the tubular electrolyte fluid; and
the hollow fiber electrolyte fluid suffusing in the interior fiber volume;
wherein the first solid electrodes are in direct contact with the hollow fiber electrolyte fluid;

wherein each of the first and second solid electrodes is of solid form throughout a full length of the solid electrode;

wherein the sealing system and the electrolyte impervious membranes cooperate to ensure there is no mixing of the tubular electrolyte fluid and the hollow fiber electrolyte fluid in the electrochemical device; and wherein the electrochemical device presents at least one of:
a peak charge and discharge power densities of >600 W/L and >150 W/L, respectively;
a Coulombic efficiency of 99% or greater;
a specific capacity of 500 mAh/g or greater;
a stable capacity retention of 75% or greater after 100 cycles, wherein each cycle is a period of time for the electrochemical device to exhaust its potential and recharge to a maximum rechargeable potential;
a specific capacity change of 5% or less; or
a volume change of 40% or less.

16. The electrochemical device of claim 15 further comprising:
a first pump configured to pump a flow of the hollow fiber electrolyte fluid through the interior fiber volumes of the hollow fibers; and
a second pump configured to pump a flow of the tubular electrolyte fluid through the interior tubular volume of the tube;
wherein:
flows of the hollow fiber and tubular electrolyte fluids via the first and second pumps generate a potential difference across the first solid electrodes and the second solid electrodes via an ion exchange between the hollow fiber electrolyte fluid and the tubular electrolyte fluid across the electrolyte impervious membranes; and
the flow of at least one of the hollow fiber electrolyte fluid and the tubular electrolyte fluid is selected from the group consisting of continuously flowing electrolyte fluid and periodically flowing electrolyte fluid.

17. The electrochemical device of claim 16, wherein:
the electrolyte impervious membranes comprise an ionomer, a polymer, and a copolymer;
the polymer is selected from the group consisting of polyethylene, polypropylene, polyfluoroethylene, perfluorosulfonate, polytetrafluoroethylene, sulfonated poly (arylene thioether ketone ketone), sulfonated poly (ether ketone) and combinations thereof; and
the copolymer selected from the group consisting of sulfonated tetrafluoroethylene monomer, perfluorinated monomer, perfluorosulfonic acid monomer, perfluorovinyl ether monomer, and combinations thereof.

18. The electrochemical device of claim 17, wherein:
the hollow fiber electrolyte fluid is selected from the group consisting of a fluid comprising metal ions, halide ions, and an organic electrolyte;
the tubular electrolyte fluid is selected from the group consisting of a fluid comprising metal ions, halide ions, and an organic electrolyte;
the metal ions are selected from the group consisting of lithium, sodium, magnesium, aluminum, potassium, calcium, titanium, vanadium, chromium, iron, cobalt, nickel, copper, zinc, rubidium, zirconium, ruthenium, rhodium, lead, silver, cadmium, indium, tin, cesium, tungsten, rhenium, osmium, iridium, platinum, gold, lead, and combinations thereof;
the halide ions are selected from the group consisting of iodide, bromide, chloride, fluoride, and combinations thereof; and
the organic electrolyte is selected from the group consisting of quinone bromine, methyl viologen, anthraquinone, 2,2,6,6,-tetramethylpiperidine-1-oxyl, and 4-methoxy-2,2,6,6-tetra-methylpiperidine-1-oxyl, 2,5-di-tert-butyl-1,4-bis (2-methoxyethoxy) benzene, quinoxaline, camphorquinone, and combinations thereof.

* * * * *